United States Patent [19]

Hagyuda

[11] 4,368,966
[45] Jan. 18, 1983

[54] PHOTOGRAPHIC SYSTEM INCLUDING REMOTE CONTROLLABLE FLASH UNIT

[75] Inventor: Nobuyoshi Hagyuda, Tokyo, Japan

[73] Assignee: Nippon Kogaku K.K., Tokyo, Japan

[21] Appl. No.: 304,024

[22] Filed: Sep. 21, 1981

[30] Foreign Application Priority Data

Sep. 24, 1980 [JP] Japan ................................. 55-132646

[51] Int. Cl.³ ....................... G03B 15/05; H05B 41/34
[52] U.S. Cl. ........................................ 354/33; 354/35;
354/131; 354/140; 250/214 SF; 315/151;
315/152; 315/241 P
[58] Field of Search ................................... 354/32-35,
354/60 F, 131, 132, 140, 145; 315/151-153, 241
P; 250/214 P, 214 SF

[56] References Cited

U.S. PATENT DOCUMENTS 3,944,877 3/1976 Sato ................................. 250/214 SF
4,155,029 5/1979 Yamaoka ........................ 354/131 X

*Primary Examiner*—William B. Perkey
*Attorney, Agent, or Firm*—Fitzpatrick, Cella, Harper & Scinto

[57] ABSTRACT

A photographic system including a flash unit wirelessly controlled. The system comprises a controller interlocked with the photographic camera and a flash unit operable in response to the controller to illuminate object. Start and stop of flashing of the flash unit are controlled by control means in a particularly determined manner so as to prevent maloperation of the unit.

10 Claims, 18 Drawing Figures

PHOTOGRAPHIC SYSTEM INCLUDING REMOTE CONTROLLABLE FLASH UNIT

BACKGROUND OF THE INVENTION

1. Field of the Invention

The present invention relates to a photographic system provided with a wirelessly controllable flash unit.

2. Description of Prior Art

In the art, it is well known to carry out picture taking using a plural number of flash devices. In this case, according to the prior art, one of the flash devices is directly mounted on the camera and the remaining flash devices are connected to the camera through wire codes in such manner as to respond to the release of camera shutter and the completion of flash output control successively. However, such flash light photographing involves some problems. Wiring of codes between the camera and flash devices is very troublesome. Furthermore, there often occurs the trouble of wire breaking.

To solve the problem it has already been proposed to use the light generated from the master flash device directly mounted on the camera as a firing start signal for the remaining slave flash devices. According to the known system, the remaining slave flash devices are started flashing by a firing start signal derived from the light emitted from the master flash device. However, this system also has a drawback. The illumination of object is always made from the position of the camera by the master flash device. Therefore, the freedom of lighting selection for picture taking is extremely restricted by it.

SUMMARY OF THE INVENTION

Accordingly, it is the general object of the invention to improve the remote control system for such photographic flash unit.

According to the invention, the object is attained by a system comprising a controller interlocked with a camera and a flash unit operable in response to the controller to illuminate an object to be taken. The controller includes a light emission source which performs a first firing in link with a shutter releasing operation of the camera and then performs a second firing a predetermined time after the first firing. When the exposure value reaches a selected value, the light emission source performs a third firing. On the other hand, the flash unit includes control means which makes the flash unit start flashing in response to the coupled first and second firings by the controller and terminates the flashing in response to the third firing by the controller.

With such a system according to the invention, the flash unit is allowed to flash in response only to a couple of firings generated within a certain determined time. Consequently, any maloperation of the flash unit otherwise caused by other unrelated flash unit etc. can be prevented completely.

Other and further objects, features and advantages of the invention will appear more fully from the following description taken in connection with the accompanying drawings.

BRIEF DESCRIPTION OF THE DRAWINGS

FIGS. 6A to 6H show waveforms of the outputs produced during the operation of the circuit shown in FIG. 5;

DESCRIPTION OF PREFERRED EMBODIMENTS

Figure 1:
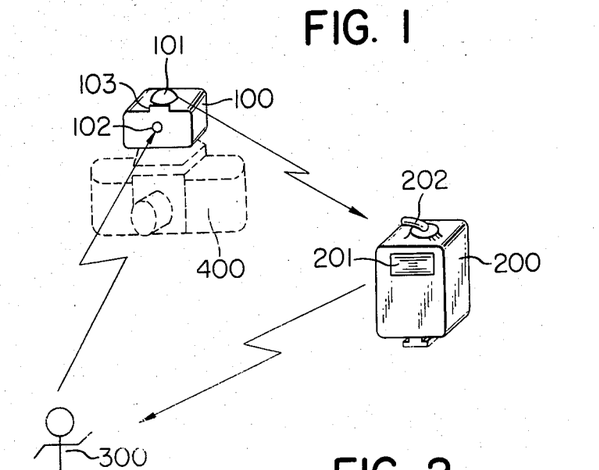
FIG. 1 is a schematic view of the photographic system according to the invention.

Referring first to FIG. 1, the main body of a wireless controller 100 mounted on the camera 400, and a flash unit 200 are shown. In response to a signal responding to a shutter releasing operation of the camera, for example, to closing of the synchronous contact, the controller 100 executes a first firing and after the lapse of a certain determined time subsequent to the first firing the controller executes a second firing at its light emission part 101. These two firings successively done with a predetermined time interval therebetween are detected by a photo detector part 202 of the flash unit 200. Upon the detection of these two firings in succession, the flash unit 200 makes its light emission part 201 flash to illuminate an object 300. At a photo detector part 102, the controller 100 receives the reflected light from the illuminated object 300. The light received by the photo detector part 102 is converted photo-electrically and integrated as the quantity of reflected light. As soon as the quantity of light reaches a determined level, the controller 100 makes the light emission part 101 perform a third firing. The flash unit 200 detects it by the photo detector part 202. Upon detecting the third firing, the flash unit 200 terminates the flashing of its light emission part 201.

Figure 2:
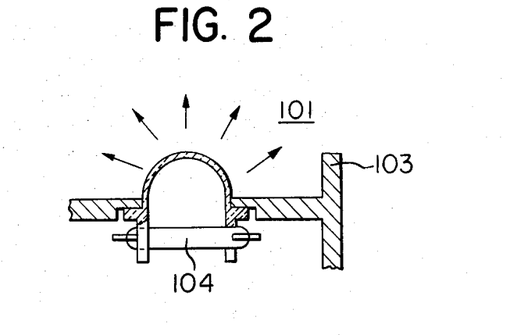
FIGS. 2 and 3 show, in sectional view, two different embodiments of the light emission part of the controller in accordance with the invention.

FIG. 2 shows a form of the light emission part 101 of the above controller 100. In this embodiment, the light emission part 101 is composed of a transparent or white window in the shape of dome and a discharge tube 104 disposed within the dome-shaped window. A screen wall 103 is provided between the light emission part and the object 300 to prevent the object from being directly irradiated by the light emitted from the light emission part.

Figure 3:
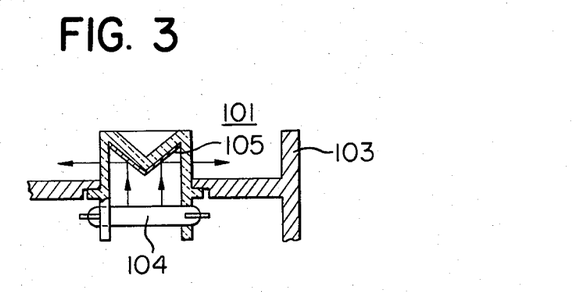

FIG. 3 shows another form of the light emission part 101. 105 is a reflecting layer coated on the inside surface of the wall above the discharge tube 104. The light emitted from the discharge tube is reflected by the reflecting layer 105 to the transparent side wall through which the reflected light can go out.

Figure 4:
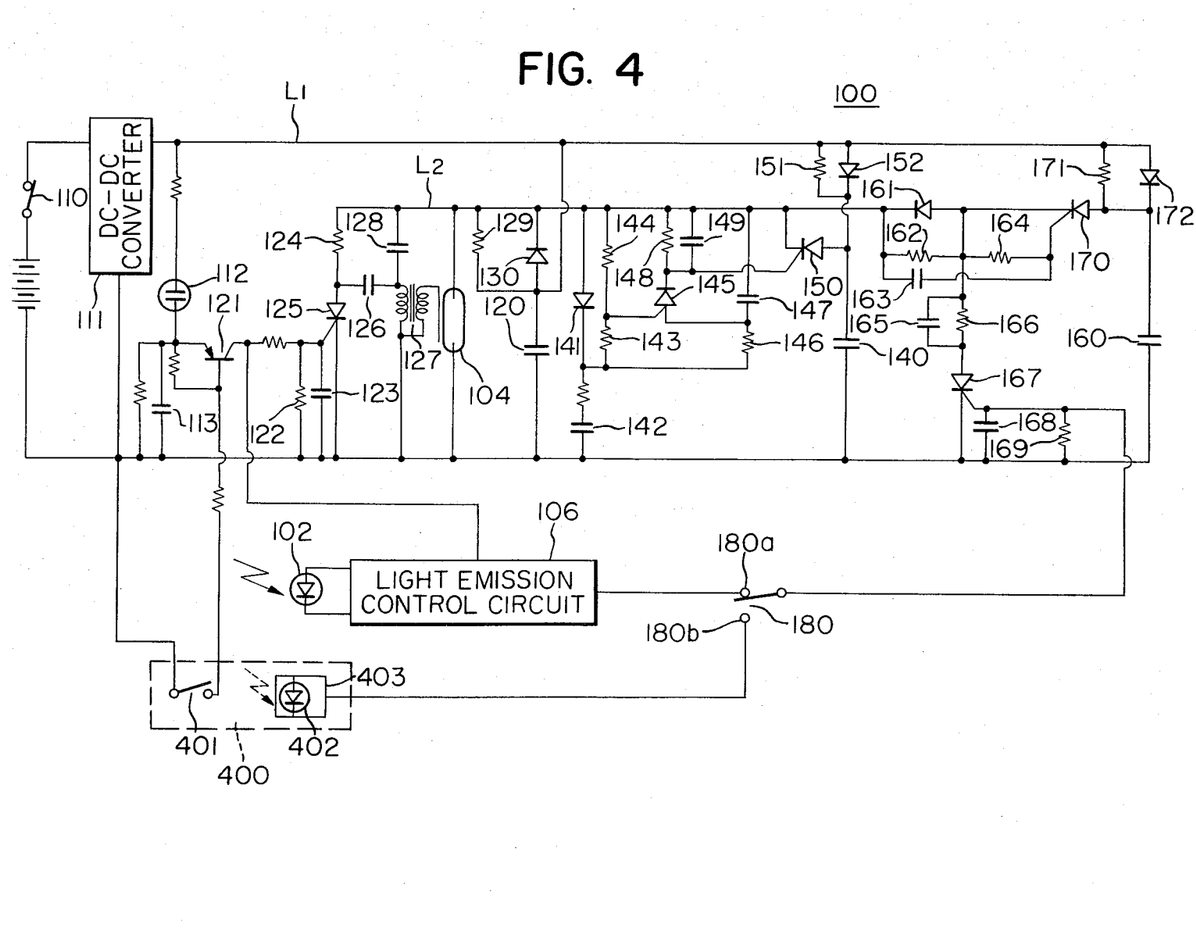
FIG. 4 is a circuit diagram showing an embodiment of the controller in accordance with the invention.

A circuit form of the controller 100 is shown in FIG. 4. With closing of the main switch 110, a DC-DC converter 111 begins to increase voltage which is applied to line $L_1$ to charge a first main capacitor 120. Also, a second main capacitor 140 and a third main capacitor 160 are charged through diodes 152 and 172 respectively. Resistors 151 and 171 serve to set the charge voltages on the first to third main capacitors to nearly the same level. Upon completion of charging, a neon tube 112 lights on to indicate the completion of charging the main capacitors. At the same time, a capacitor 113 is charged up to a determined voltage level. Transistor 121, SCR 125, trigger coil 127, capacitors 123, 126, 128 and resistor 126 constitute a trigger circuit for the discharge tube 104. The capacitor 126 is charged through a parallel circuit constituted of diode 130 and resistor 129 and through a resistor 124 when the charging of the first main capacitor 120 is completed. A synchronous contact 401 is provided in the camera 400. When the contact 401 is closed, the transistor 121 becomes conductive. Thereby, the capacitor 113 already charged up to a determined voltage begins discharging to make current flow into the gate of SCR 125 and also to deliver a start signal to a light emission control circuit 106. With the conduction of SCR 125, the capacitor 126 begins discharging and therefore the discharge tube 104 is triggered through the trigger coil 127. Thus, current flows into the discharge tube 104 from the first main capacitor 120 to carry out a first firing.

At the same point of the first main capacitor 120 being charged completely before the first firing, a capacitor 142 gets charged through Zener diode 141 and a resistor. After the first firing, this previously charged capacitor begins discharging because of voltage drop in line $L_2$. The discharge current flows into the line $L_2$ through Zener diode 141. As a result, a Zener voltage is produced at both ends of the Zener diode. By this voltage, a delay circuit is brought into operation which is constituted of PUT 145, SCR 150, resistors 143, 144, 146, 148 and capacitors 147 and 149. The resistors 143 and 144 in series are connected parallel to Zener diode 141. Similarly, the resistor 146 and capacitor 147 in series are parallel connected to Zener diode 141. The gate of PUT 145 is connected between the resistors 143 and 144 and the anode thereof is connected between the resistor 146 and capacitor 147. When the charge voltage on the capacitor 147 reaches a threshold level determined by the gate voltage divided by the resistors 143 and 144, PUT 145 becomes conductive to discharge the capacitor 147 and turn SCR 150 conductive. As a result, the discharged current from the capacitor 140 flows into the discharge tube 104 to trigger it. Thus, a second firing is initiated. The time interval between the first and second firings is preset by the threshold voltage of the above delay circuit and the time constant of capacitor 147 and resistor 146.

Receiving the first and second firings in succession, the flash unit 200 starts flashing to illuminate the object.

The photo detector part 102 of the controller including photo diode receives the reflected light from the object and the light emission control circuit 106 starts integrating the quantity of the received light. When the quantity of light reaches a determined level, the control circuit 106 puts out a high level signal at its terminal 108a. This output from the light emission control circuit 106 turns SCR 167 conductive so long as the switch 180 is in the position closed on the side of the terminal 180a.

By the time immediately before SCR 167 is turned conductive, the capacitors 163 and 165 have been discharged up to a level nearly equal to the remaining voltage on the first main capacitor 120 (about 50 V) through resistors 162 and 164 in series and through a resistor 166 respectively. When SCR 167 is not conductive, the voltage on the gate and cathode of SCR 170 is the above mentioned remaining voltage. In this position, when SCR 167 is turned conductive, then the cathode voltage of SCR 170 becomes lower than the gate voltage and therefore SCR 170 is made conductive. Diode 161 inhibits charge current from flowing in the capacitor 165 from line $L_2$. When SCR 170 is turned conductive, the discharge current from the third capacitor 160 triggers the discharge tube 104 in the same manner as that for the second firing. Thus, a third firing is performed. The flash unit 200 detects this third firing and terminates its own flashing.

If the camera 400 itself has a photodetector 402 and a TTL light emission control circuit 403 mounted therein, then TTL light emission control is also possible. TTL control circuit 403 mounted in the camera gives a flash stop signal to a terminal designated by 180b when the quantity of light reflected by the object and received by the photo detector 402 through the camera lens reaches a determined level. Therefore, when TTL control is to be selected, man switches over the switch 180 to the terminal 180b.

The parallel capacitor-resistor circuits 122–123, 148–149 and 168–169 interposed in the respective gate circuits of three SCR serve as noise filter.

The flash unit whose flashing is controlled by the above controller will be described hereinafter with reference to FIG. 5.

Figure 5:
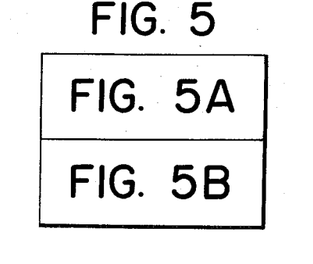
FIG. 5 comprises FIG. 5A and FIG. 5B, each being a circuit diagram showing an embodiment of the flash unit in accordance with the invention.
Figure 5A:
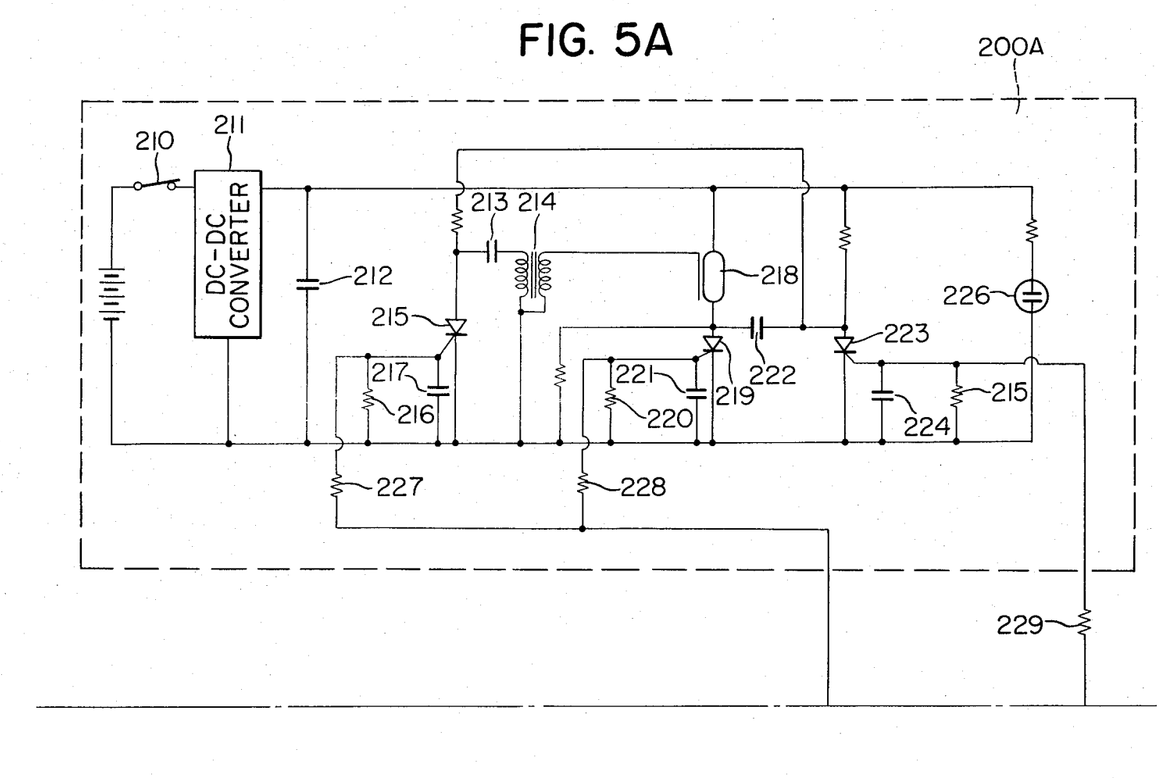
Figure 5B:
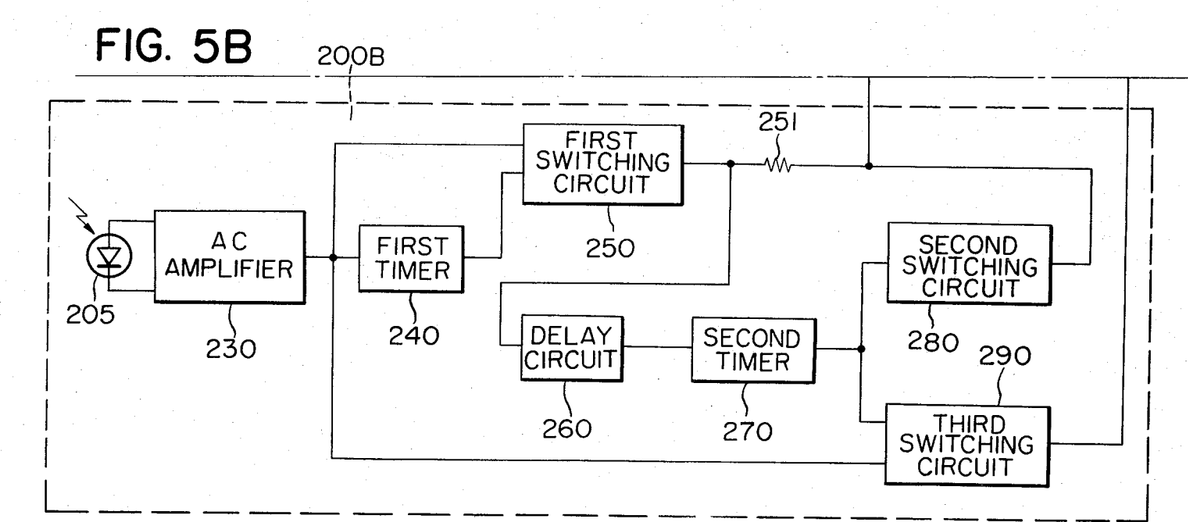

In an embodiment of the flash unit 200 shown in FIG. 5, the flash unit circuit includes a light emission part 200A and a control part 200B.

In the light emission part 200A, when the main switch is closed, a DC-DC converter 211 boosts the supply voltage and puts out the boosted voltage by which a main capacitor 212 is charged. When the charge voltage on the main capacitor 212 reaches a sufficient level enough to make a discharge tube 218 discharge, a neon tube 226 lights on to indicate the completion of charging. The output of the converter 211 charges a commutating capacitor 222 and trigger capacitor 213.

215, 219 and 223 are SCR whose gate circuits include resistors 216, 220 and 225 and capacitors 217, 221 and 224 respectively to filter off noises. The respective gates of three SCR are biased by signals from the control part 200B through resistors 227, 228 and 229 respectively. When SCR 215 and 219 are turned conductive by firing start pulse signal generated from the control part 200B, the discharge tube 218 triggered by the capacitor 213 and coil 214 starts discharging and firing. This firing of the discharge tube is maintained for a time length corresponding to the amount of charge on the charged main capacitor 212. After the determined time, the control part 200B generates a firing stop pulse signal by which SCR is turned conductive. Thereby, one electrode, that is, the voltage on the positive side of the charged commutating capacitor 222 is grounded. Therefore, the voltage on the other electrode of the commutating capacitor is biased toward negative. Consequently, SCR is turned off (inconductive) and discharge of the discharge tube is terminated.

The control parts 200B are composed of blocks 230–290. A photodetector 205 is provided for detecting the firing of the above mentioned controller 100. The output from the photo detector 205 is amplified by an amplifier 230. The amplifier 230 is an AC amplifier formed in such manner that its gain for low frequency is so small that it can not produce any output in response to a gentle change of brightness as occurred under common light condition but it has a gain of determined level for an abrupt change of brightness as caused by the light emitted from the controller 100. The relation between the firing of the controller 100 and the output level of AC amplifier 230 is seen in FIG. 6.

Figure 6A:
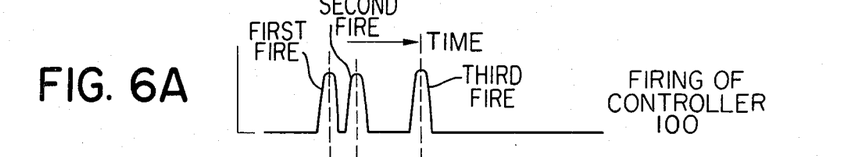
Figure 6B:
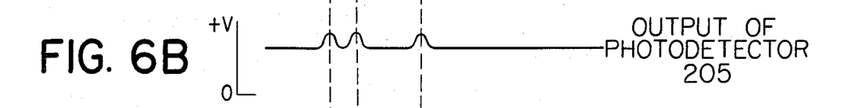
Figure 6C:
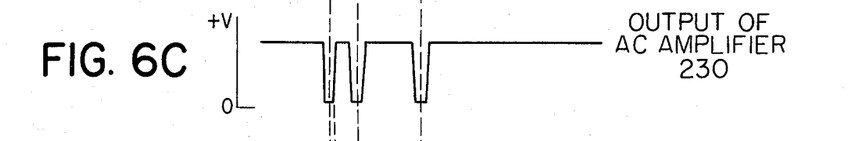
Figure 6D:
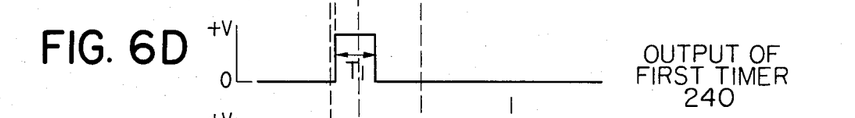

The controlle 100 is fired as shown in FIG. 6A. When the photo detector 205 of the control part 200B receives the light emitted from the controller 100, the output level of AC amplifier 230 becomes Low as shown in FIG. 6C. When the firing of the controller 100 is terminated, the output level of the amplifier 230 becomes High. By this change of the output level of AC amplifier 230 from Low to High, a first timer 240 is triggered to supply the source power to a first switching cicuit 250 for a determined time of T1 as shown in FIG. 6D.

Figures 6E, 6F, 6G:
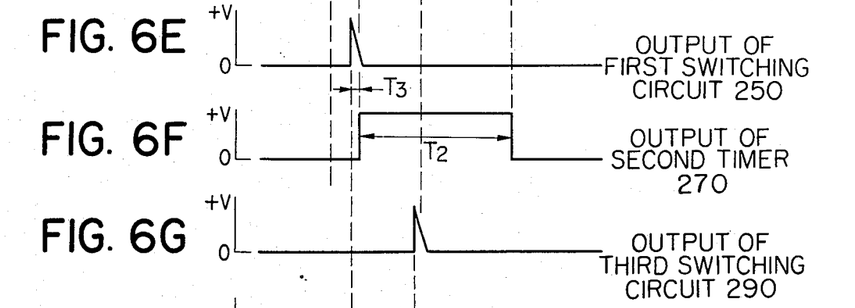

The controller 100 is so preset as to perform a second firing within this time period of T1. The output level of the first switching circuit 250 is normally at Low. On the second firing of the controller 100, the output level of AC amplifier 230 again changes from High to Low. This change forms an signal by which the output level of the first switching circuit 250 is changed to High as shown in FIG. 6E. This high level output signal is applied to SCR 215 and 219 through a resistor 251 to turn the SCR conductive. However, if the controller 100 fails to execute the second firing in this time of T1 during which the first timer can be On, then no output signal is produced from the first switching circuit 250 because of no power supply to it. Therefore, in this case, the flash unit 200 can not flash.

The output of the first switching circuit 250 is applied to a second timer 270 through a delay circuit 260. As shown in FIG. 6F, the second timer 270 is triggered after a delay time of T3 under the action of the delay circuit 260. When triggered, the second timer 270 applies the supply current to the second and third switching circuits 280 and 290 for a determined time of T2 which is sufficiently longer than flash time. When power-supplied from the second timer 270, the second switching circuit 280 drops its output level to Low so that during the period of T2, no high level signal can be applied to the gates of SCR 215 and 219 anymore, although the first switching circuit 250 may produce a high level signal in response to the third firing of the controller 100.

Figure 6H:
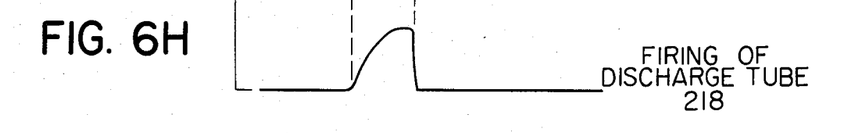

The current supply to the third switching circuit 250 is maintained during the time period of T2 subsequent to the second firing of the controller 100. When the output level of AC amplifier 230 is changed from High to Low in response to the third firing of the controller 100, the third switching circuit 290 puts out a high level signal as shown in FIG. 6G. This high level output signal turns SCR 223 conductive through resistor 229 and therefore terminates the firing of the discharge tube 218 as seen in FIG. 6H.

The delay time T3 is provided to prevent the third switching circuit 290 from responding to the output generated from AC amplifier 230 at the second firing of the controller 100. As described above, the output level of AC amplifier 230 changes from High to Low in response to the second firing of the controller. The delay circuit 260 prevents power supply to the third switching circuit 290 from the timer 270 responding to this change of the output level at the second firing.

As understood from the foregoing, in this embodiment, the flash unit 200 begins flashing only when it detects the successive first and second firings of the controller 100 within a determined time length. At the following third firing of the controller, the flash unit terminates flashing.

Figure 7:
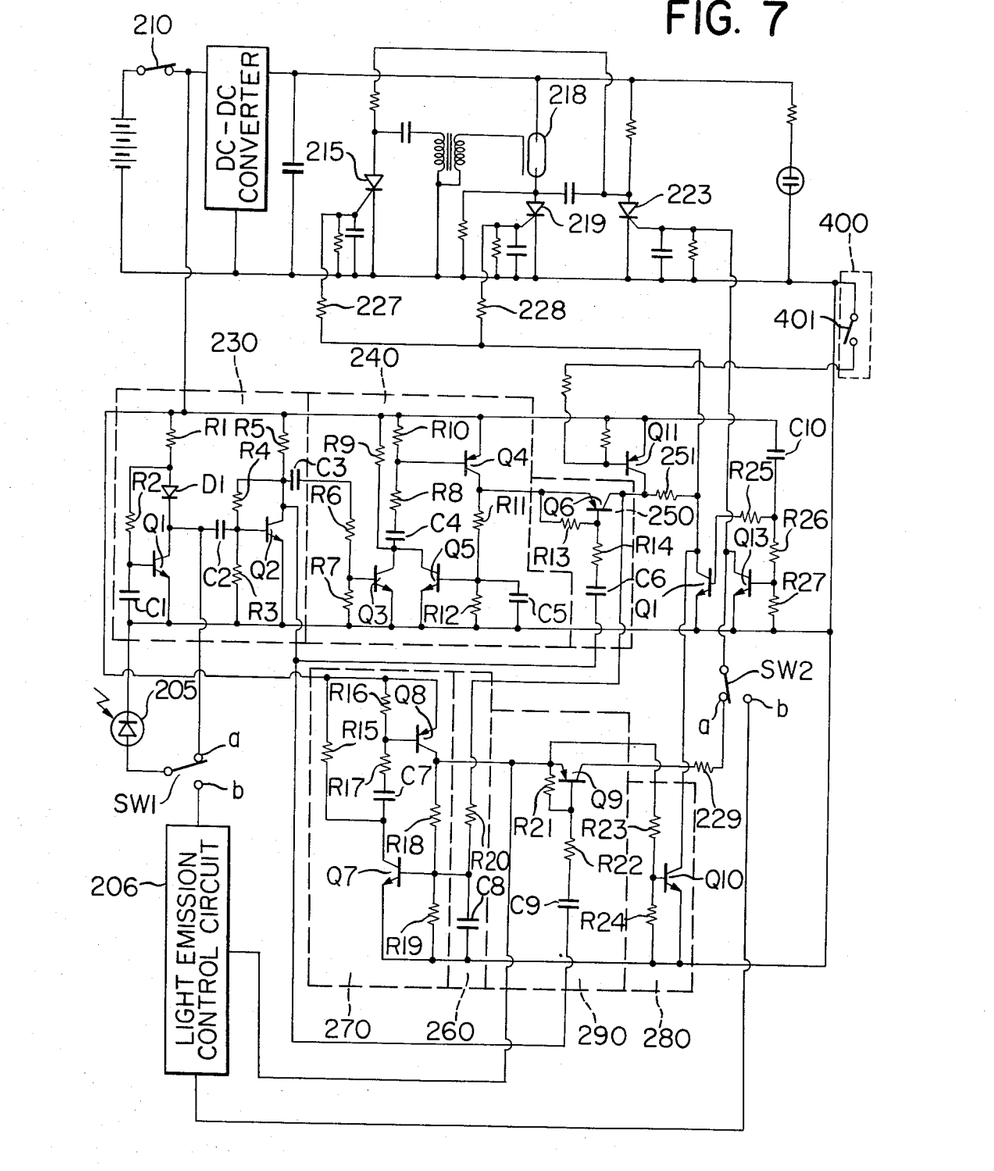
FIG. 7 shows the structure of the circuit shown in FIG. 5 more concretely.

A concrete form of the circuit of the control part 200B is shown in FIG. 7. As for the light emission part 200A, the circuit is the same as that shown in FIG. 5 and therefore need not be further described.

In FIG. 7, which shows interlocking switches SW1 and SW2. In the shown position, these switches are in contact with terminals a. In this position of the interlocking switches SW1 and SW2, the flash unit 200 is operated under the control of the controller 100.

The photo detector 205 is connected to a bias circuit constituted of resistors R1, R2, capacitor C1, diode D1 and transistor Q1. Under the ordinary light condition, the photo current flows from the anode of the photo detector 205 to the cathode thereof through the collector and emitter of the transistor Q1. If there occurs a relatively gentle change in brightness of the ordinary light, for example, if it becomes brighter and the photo current increases, then the voltage $V_{CE}$ between the collector and emitter of the transistor Q1 will rise up. However, at the time, the anode voltage of diode D1 will rise up so that the base current of the transistor Q1 is increased and the collector current is increased. This prevents the voltage $V_{CE}$ from rising up. On the contrary, if it becomes darker and the photo current of the photo detector 205 decreases down, then the collector current of the transistor Q1 will decrease and $V_{CE}$ will drop down. However, at this time, the anode voltage of diode D1 drops down so that the base current of the transistor Q1 is decreased. This prevents the voltage $V_{CE}$ from dropping down. In this manner, the bias circuit forms a negative feedback to compress the anode potential of photo detector 205 throughout a wide illuminance range. The capacitor C1 serves to lower the response speed of the feedback loop. Therefore, this circuit can adequately respond to a gentle change in brightness under the ordinary light. But, it can not respond to any abrupt change of brightness caused by the flash light emitted from the controller. Therefore, in the latter case, the anode potential of photo detector 205 changes violently. This bias circuit, capacitor C2 connected to the anode of photo detector 205 and an AC amplifier circuit composed of resistors R3, R4 and R5 and a transistor Q2 from together the above mentioned AC amplifier 230. The output thereof appears at the collector of Q2.

Resistors R6 and R7 connected to the amplifier 230 through a capacitor C3, transistors Q3, Q4 and Q5, resistors R8-R12 and capacitors C4 and C5 form together the above mentioned first timer 240. When the output level at the collector of the transistor Q2 changes from Low to High, the charge current on the capacitor C3 flows into the base of the transistor Q3. After the transistor Q3 has once been turned conductive, the charge current on the capacitor C4 becomes the base current of transistor Q4 so that transistors Q4 and Q5 are turned conductive. After the transistor Q5 has once been turned conductive, the transistors Q4 and Q5 continue to be conductive until the capacitor C4 is completely charged, even if the transistor Q3 becomes Off. This period T1 is primarily determined by the values of capacitor C4 and resistor R8. The length of this period T1 should be set to be a little longer than the time interval between the first and second firings of the controller 100.

The first switching circuit 250 previously shown in FIG. 5 is constituted of resistors R13, R14, transistor Q6 and capacitor C6. Power supply to the first switching circuit 250 is effected by the collector of transistor Q4.

The first switching circuit 250 is turned On when the potential at the collector of the transistor Q2 changes from High to Low within the above timer time of T1. With the turn-On of the first switching circuit, transistor Q6 becomes conductive, which in turn makes SCR 215 and 219 conductive through resistors 251, 227 and 228 to start firing of the discharge tube 218. Also, it delivers a high level signal to the after-connected delay circuit 260. This delay circuit 260 is constituted of resistor R20 and capacitor C8. After a delay time of T3 preset by the resistor R20 and capacitor C8, the delay circuit turns transistor Q7 conductive.

Transistors Q7, Q8, resistors R15–R19 and capacitor C7 constitute together the previously mentioned second timer 270. With a delay time of T3 after turn-ON of the first switching circuit 250, the transistor Q8 becomes conductive to supply current to the after-connected second and third switching circuits 280 and 290. The current supply time T2 during which the second time 270 is in operation, should be set to be sufficiently longer than the firing time of discharge tube 218.

Transistor Q10, resistors R23 and R24 constitute the second switching circuit 280. With the start of operation of the second timer 270, the transistor Q150 becomes conductive so that gate lines of SCR 215 and 219 are grounded. This prevents a further application of high level signal to the gates of SCR 215 and 219 at the third firing of the controller 100.

Transistor Q9, resistors R21, R22 and capacitor C9 together from the third switching circuit 290. When the collector potential of the transistor Q2 changes from High to Low, the transistor Q9 is turned conductive which in turn makes SCR 223 conductive through resistor 229 and the contact a of SW2 to terminate the firing of discharge tube 218.

Since the second time 270 is turned On with a delay time of T3 after the turn-On of the first switching circuit 250, it is possible to make the third switching circuit 290 operate in response only to the rise-up of the third firing but not to the rise-up of the second firing by setting the time constant of the capacitor C9 to a time shorter than the delay time T3.

Connected to the terminal b of the switch SW1 is a conventional type of light emission control circuit 206. By switching over the switches SW1 and SW2 to the corresponding terminal b it is made possible to use the above shown flash unit also as a conventional flash unit. In this case, the synchronous contact 401 on the camera is connected to the above circuit at the mounting of flash unit 200 on the camera.

When the synchronous contact 401 is closed, the transistor Q11 becomes conductive and current flows into the gates of SCR 215 and SCR 219 through resistors 251, 227 and 228. Thereby, the discharge tube 218 is triggered and it starts flashing.

The photo detector 205 photo-electrically converts the reflected light from the object. As soon as the transistor Q8 becomes conductive, the light emission control circuit 206 receives the output signal from the photo detector 205 and carry out the integration of quantity of the reflected light. When the quantity of light reaches a determined level, the light emission control circuit 206 transmits a stop signal to the gate of SCR 223 to terminate the flashing.

Resistors R25–R27, capacitor C10 and transistors Q12, Q13 constitute a malfunction preventing circuit. The function of the malfunction preventing circuit is to keep the voltage level on the gates of the respective SCR at Low for a certain determined time subsequent to the throw-in of the voltage source thereby preventing these SCR 215, 219 and 223 from being turned conductive by noise or other similar signal which may be generated at the time of rising of the circuit when the source supply switch 210 is closed.

Figure 8:
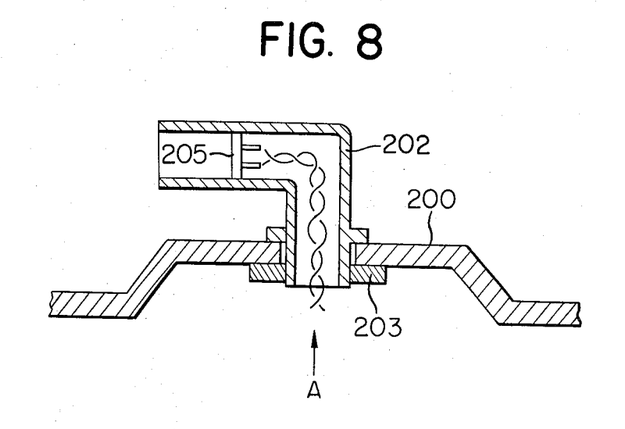
FIG. 8 shows, in sectional view, an embodiment of the photo detector part of the flash unit.

FIG. 8 is an enlarged view of the photo detection part 202 shown in FIG. 1.

The photodetector part 202 is formed as an elbow tube rotatably mounted on the casing of the body of the flash unit 200. A photo detector element 205 is disposed in the elbow tube 202 so as to give a desired directivity to the photo detector element 205. Therefore, the photo detector element 205 can correctly be directed toward the light emission part 101 of the controller 100 by suitably rotating the tube 202 on the flash unit casing. In this manner, the photo detector part can take a position to selectively receive the light emitted from the wireless light emission controller and perform its function correctly without being affected by the light emitted from the flash unit 200 itself.

Figure 9:
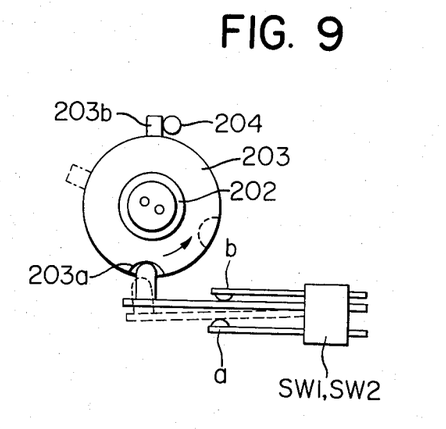
FIG. 9 is a bottom view of the photo detector part looking in the direction of arrow A in FIG. 8.

The photo detector part 202 has a rotary member 203 integrally formed with the photo detector part. As shown in FIG. 9, the rotary member 203 has a notch 203a and a projection 203b provided thereon. When the photo detector part 202 is rotated to a position in which the photo detector faces toward the same direction as the front of the flash unit faces, the switches SW1 and SW2 are engaged in the notch 203a on the rotary member 203. Thus, the switches are automatically switched over to the side of terminal b. This structure makes it unnecessary to provide a particular change-over switch. By turning the face of the photo detector toward the object after mounting the flash unit 200 on the camera, the system is automatically changed over to the position for a conventional light emission control. This eliminates errors in operation as occurred if a particular change-over switch was provided. A stopper 204 against which the above projection 203b abuts when the photo detector part 202 is turned. The provision of such stopper 204 prevents undue twisting of the wire cords extending from the photo detector element 205 when the photo detector part is rotated on the flash unit 200.

I claim:
1. A photographic system including a camera capable to generate a signal in synchronism with an exposure operation, said photographic system comprising:
(a) a flash unit comprising:
flash means operable to fire to illuminate an object; photo-electric conversion means operable to generate outputs corresponding to variation of intensity of incident light; and control means having timer means and operable to actuate said flash means in response to a second output of said conversion means generated within a pre-determined time period subsequent to the first output of said conversion means and to terminate the operation of said flash means in response to a third output of said conversion means generated after the actuation of said flash means, and
(b) a controller comprising:
means for receiving the light from said object illuminated by said flash means and integrating the quantity of the received light; and
light emitting means for carrying out a first firing in response to said synchronous signal, a second firing within said pre-determined time period after said first firing and a third firing in response to said integrating means, said firings being conducted toward said flash unit.

2. A photographic system including a camera capable to generate a signal in synchronism with an exposure operation and to generate a control signal in response to receiving a determined quantity of light from an object during the exposure, said photographic system comprising:
   (a) a flash unit comprising:
      flash means operable to illuminate the object; photo-electric conversion means operable to generate outputs corresponding to variation of intensity of incident light; and control means having timer means and operable to actuate said flash means in response to a second output of said conversion means generated within a pre-determined time period subsequent to the first output of said conversion means and to terminate the operation of said flash means in response to a third output of said conversion means generated after the actuation of said flash means, and
   (b) a controller comprising:
      light emitting means for carrying out a first firing in response to said synchronous signal, a second firing within said pre-determined time period after said first firing and a third firing in response to said control signal, said firings being conducted toward said flash unit.

3. A photographic system as set forth in claim 1 or 2, wherein said timer means operates in response to the first output from said photo-electric conversion means.

4. A photographic system as set forth in claim 1 or 2, wherein said control means comprises first switch means (250) responsive to the second output of said photo-electric conversion means and second switching means (290) responsive to the third output of said conversion means, and wherein said timer means allows said first switch means to operate within said pre-determined time period.

5. A photographic system as set forth in claim 4, wherein said control means includes another timer means (270) for allowing said second switch means to operate only after the generation of said first output.

6. A photographic system as set forth in claim 5, wherein said another timer means includes means (260) for locking said second switch means against operating during a determined time subsequent to the generation of said first output.

7. A photographic system as set forth in claim 5, wherein said control means further comprises means (280) for locking said first switch means against operating in response to said another timer means.

8. A photographic system as set forth in claim 1 or 2, wherein said light emitting means comprises:
   (a) a light emitting element (104);
   (b) first means for driving said light emitting element to said first firing;
   (c) delay means responsive to said first means;
   (d) second means for driving said light emitting to said second firing in response to said delay means; and
   (e) third means for driving said light emitting element to said third firing.

9. A photographic system as set forth in claim 1 or 2, wherein said photo-electric conversion means includes a photo detector disposed for receiving the light from said light emitting means and wherein said flash unit includes means (202) for determining the direction of light in which the light can enter said photo detector.

10. A photographic system including a flash unit operable to fire to illuminate an object; a camera capable to generate a signal in synchronism with an exposure operation and a unit capable to generate a control signal in response to receiving a determined quantity of light from said object illuminated by said flash unit, said photographic system comprising:
   (a) light emitting means for carrying out a first firing and a second firing with an interval therebetween in response to said synchronous signal and further a third firing in response to said control signal;
   (b) photo detector means for generating an output corresponding to the light from said light emitting means;
   (c) control means including timer means and operable to actuate said flash unit in response to the output corresponding to said second firing only when said second firing is carried out within a pre-determined time period subsequent to said first firing and to terminate the operation of said flash unit in response to the output corresponding to said third firing; and
   (d) said light emitting means including delay means for conducting said second firing within said pre-determined time period subsequent to said first firing.

* * * * *

UNITED STATES PATENT AND TRADEMARK OFFICE
CERTIFICATE OF CORRECTION

PATENT NO. : 4,368,966
DATED : January 18, 1983
INVENTOR(S) : NOBUYOSHI HAGYUDA

It is certified that error appears in the above-identified patent and that said Letters Patent is hereby corrected as shown below:

Column 3, line 5, "126" (2nd. occurr.) should read --124--;

Column 5, line 21, "same" should read --time--.
Column 5, line 18; "an" should read --a--.
Column 6, line 5, delete "In"; same line, delete "which".

Column 7, line 24, "Q150" should read --Q10;

line 36, "time" should read --timer--;

line 60, "carry" should read --carries--.

IN THE CLAIMS:

Claim 8, line 7, after "emitting" insert --element--.

Signed and Sealed this

Nineteenth Day of April 1983

[SEAL]

Attest:

Attesting Officer

GERALD J. MOSSINGHOFF
Commissioner of Patents and Trademarks